May 2, 1967 J. A. CEONZO ET AL 3,317,897
MULTI-STAGE SWITCHING NETWORK
Filed Aug. 13, 1963
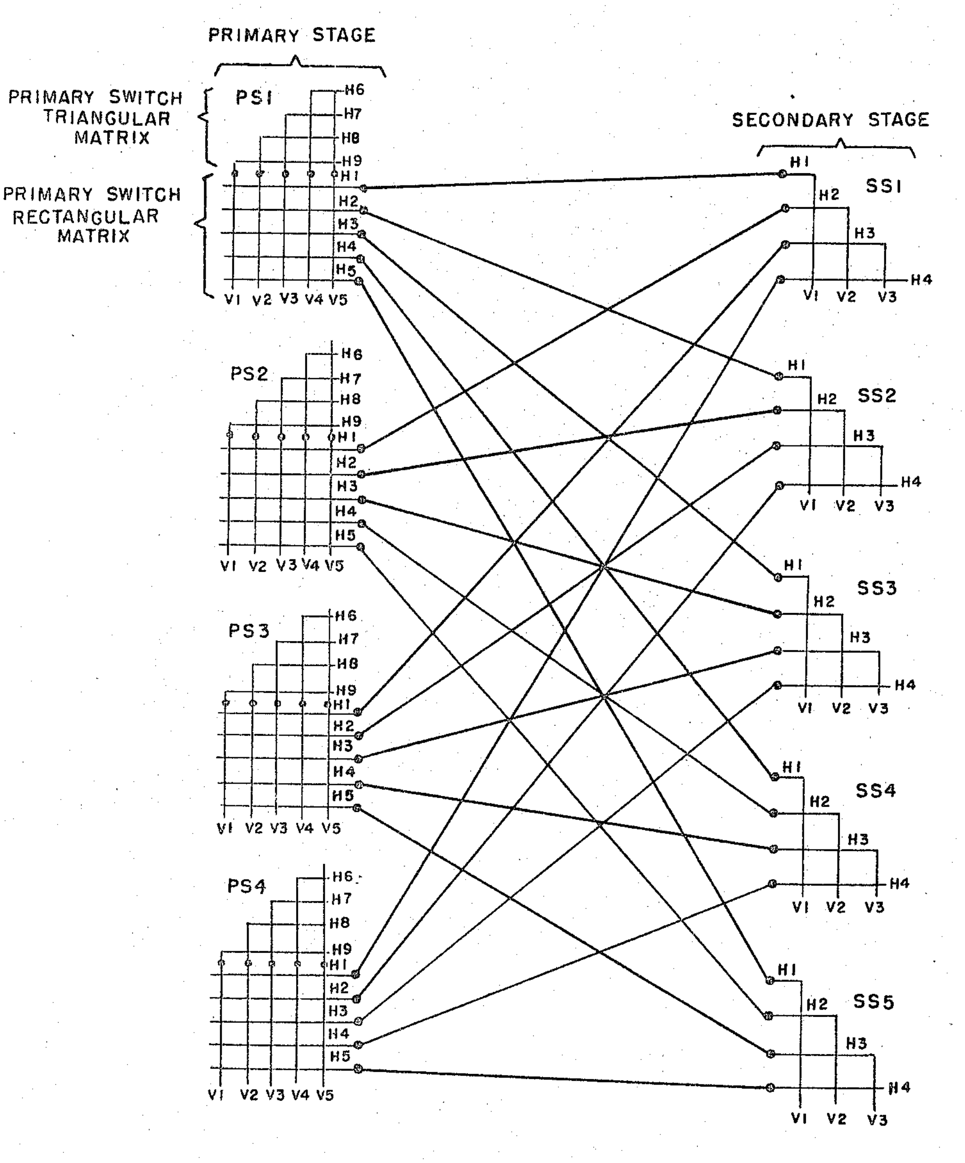
INVENTORS,
JOSEPH A. CEONZO,
LEON STAMBLER &
ALFRED WEISS
BY Harry M. Saragovitz,
Edward J. Kelly,
Herbert Berl &
Julian C. Keppler. ATTORNEYS.

United States Patent Office 3,317,897

Patented May 2, 1967

3,317,897

MULTI-STAGE SWITCHING NETWORK

Joseph A. Ceonzo, Poughkeepsie, Leon Stambler, Brooklyn, and Alfred Weiss, Kew Gardens, N.Y., assignors to the United States of America as represented by the Secretary of the Army Filed Aug. 13, 1963, Ser. No. 301,928
3 Claims. (Cl. 340—166)

This invention relates to multi-stage switching networks and more particularly to a novel arrangement of crosspoints in such networks.

The principal object of this invention is to provide a novel arrangement of crosspoints in a multi-stage switching network.

The switching network according to this invention consists of an array of rectangular primary switching matrices and two sets of triangular matrices. A triangular matrix is associated with each rectangular array of primary switches so that any two terminals located on the same rectangular primary switching matrix can be interconnected by closing one crosspoint switch on its associated triangular matrix. A connection between two lines on different primary switching matrices is accomplished by closing one cross-point on each of the respective rectangular primary switching matrices and one crosspoint on an interconnecting secondary triangular matrix. Thus three switches are required to connect two terminals on different primary switches.

The main advantage of the multi-stage network of this invention is that it permits a higher degree of service for the same number of crosspoints than can be achieved by previous multi-stage networks.

Another advantage of this invention is that nonblocking service is provided to all subscriber groups which are located on the same primary switching matrix.

These and other objects and advantages of this invention will become more apparent from the following description taken in conjunction with the drawing in which the figure shows a diagram of the multi-stage switching network of this invention.

Referring now to the drawing, there is shown a matrix consisting of an array of rectangular primary switches and two sets of triangular matrices. The overall matrix is divided into sections labeled "primary stage," which consists of four primary switches PS1 to PS4, and "secondary stage," which consists of five secondary switches SS1 to SS5.

Each primary switch consists of a triangular matrix, which is defined by the intersection of verticals V1 to V5 and horizontals H6 to H9, and a rectangular matrix which is defined by the intersection of verticals V1 to V5 and horizontals H1 to H5. Each secondary switch consists of a triangular matrix which comprises verticals V1 to V3 and horizontals H1 to H4. The horizontals H1 to H4 of each secondary switch are respectively coupled to one of the horizontals on each of the primary switches. For example, horizontal H1 of secondary switch SS1 is connected to horizontal H1 of primary switch PS1, horizontal H2 of switch SS1 is connected to horizontal H1 of switch PS2, and so on. Similarly, horizontal H1 of switch SS2 is connected to horizontal H2 of switch PS1, horizontal H2 of switch SS2 is connected to horizontal H2 of switch PS2, and so on. In this manner, each primary switch is connected to each of the remaining primary switches through each of the secondary switches. In this type of array all lines, trunks, operators, registers, or any inputs or outputs appear as verticals on the primary switches and are interchangeable.

A connection between two lines on the same primary switch is accomplished by closing a crosspoint on the primary switch triangular matrix. Thus, if verticals V3 and V5 of switch PS2 are to be connected, the crosspoint at the intersection of vertical V5 and horizontal H7 is closed. A connection betwen two lines on different primary switches is accomplished by closing one crosspoint on the respective primary switch rectangular matrices and one crosspoint on the interconnecting secondary triangular switch. A typical connection of this type would be betwen vertical V1 of switch PS1 and vertical V3 of switch PS3. To complete such a connection, the crosspoints could be closed at the intersections of vertical V1 and horizontal H2 of switch PS1, vertical V1 and horizontal H3 of switch SS2 and vertical V3 and horizontal H2 of switch PS3. It is obvious that the connection between these two terminals could be made through any of the secondary switches unless one or more of the links involved was already in use, whereupon the number of available connecting routes would decrease.

It has been determined that the multi-stage network of this invention operates as a blocking network if the number of links is less than $2n-1$ per primary switch where $n$ is the number of lines per primary switch. In a connection between two lines or verticals on the same primary switch, a link on the primary switch rectangular matrix is not used, thus relieving a link for interprimary switch connection. It therefore follows that if there are lines with anticipated heavy traffic betwen them, they are located on the same primary switch, and therefore do not contribute to link saturation. In a blocking multi-stage network, non blocking service can be provided to any number of subscriber groups by placing them on the same primary switch.

As previously indicated the matrix of this invention can provide either blocking or non blocking service, the degree of blocking being a function of the number of links per primary switch; this number can be easily increased or decreased depending upon traffic conditions. The particular blocking system considered optimum for this switchboard consists of an array having an equal number of links and subscribers per primary switch. For an array having 60 lines, 16 trunks, 4 registers and an operator's position, only 1372 crosspoints are needed. Non blocking operation for a system this size requires 2160 crosspoints, 5 verticals per primary switch being optimum.

In making the choice of a matrix, serious consideration must be given to the ease of expansion. When adding to the basic unit, provision must be made for interconnecting the units by means of cables and plugs, and while the reliability of such components is fairly good, they represent a weak point in the system and are cumbersome if used excessively. For the three stage array herein described, a great savings in plugs and cables for matrix expansion can be realized as compared with prior systems.

What is claimed is:

1. A multi-stage switching network comprising: a plurality of primary switches, each of said primary switches consisting of a rectangular and a triangular matrix; a plurality of triangular secondary switches; and conductor means for connecting each of said primary switches to each of the remaining primary switches through each of said secondary switches, so that a connection between lines on the same primary switch is made through a crosspoint on the triangular matrix associated with that primary switch, and a connection between lines on different primary switches is made through a crosspoint on each of the respective primary switches and a crosspoint on one of said triangular secondary matrices.

2. A multi-stage switching network comprising: a plurality of primary switches, each of said primary switches consisting of a rectangular matrix of verticals and horizontals; triangular matrix means connected to said rectangular matrix verticals of each primary switch for connecting any two of said rectangular matrix verticals by closing one triangular matrix crosspoint; a plurality of triangular secondary switches; and means for connecting each of said primary switches to each of the remaining primary switches through each of said secondary switches.

3. The switching network as set forth in claim 2 wherein said triangular secondary switches consist of a plurality of horizontals equal in number to the number of primary switches and a plurality of verticals equal in number to one fewer than the number of horizontals per secondary switch; and the number of triangular secondary switches is equal to the number of horizontals in each of said primary stage rectangular matrix.

References Cited by the Examiner

UNITED STATES PATENTS

| | | | |
|---|---|---|---|
| 3,115,617 | 12/1963 | Fries | 340—166 |
| 3,132,210 | 5/1964 | Adelaar | 340—166 X |
| 3,223,978 | 12/1965 | Johnson | 340—166 |

NEIL C. READ, *Primary Examiner.*

D. YUSKO, *Assistant Examiner.*